United States Patent
Nelson et al.

(10) Patent No.: US 9,656,172 B2
(45) Date of Patent: May 23, 2017

(54) UNLOCKING OF VIRTUAL CONTENT THROUGH GEO-LOCATION

(71) Applicant: Disney Enterprises, Inc., Burbank, CA (US)

(72) Inventors: Robert Nelson, Salt Lake City, UT (US); Robert Lowe, Layton, UT (US); John G. Vignocchi, Studio City, CA (US)

(73) Assignee: Disney Enterprises, Inc., Burbank, CA (US)

( * ) Notice: Subject to any disclaimer, the term of this patent is extended or adjusted under 35 U.S.C. 154(b) by 529 days.

(21) Appl. No.: 14/184,576

(22) Filed: Feb. 19, 2014

(65) Prior Publication Data

US 2015/0050995 A1 Feb. 19, 2015

Related U.S. Application Data

(60) Provisional application No. 61/866,977, filed on Aug. 16, 2013.

(51) Int. Cl.
*A63F 13/00* (2014.01)
*A63F 13/69* (2014.01)
*A63F 13/216* (2014.01)
*A63F 13/79* (2014.01)

(52) U.S. Cl.
CPC ............ *A63F 13/69* (2014.09); *A63F 13/216* (2014.09); *A63F 13/79* (2014.09)

(58) Field of Classification Search
CPC ....... A63H 33/26; A63F 13/69; A63F 13/216; A63F 13/79; A63F 13/35; A63F 13/00

USPC ...................................................... 463/31, 42
See application file for complete search history.

(56) References Cited

U.S. PATENT DOCUMENTS

| | | | |
|---|---|---|---|
| 6,682,074 B2 | 1/2004 | Weston | 273/459 |
| 6,773,344 B1 | 8/2004 | Gabai et al. | 463/1 |
| 7,066,781 B2 | 6/2006 | Weston | 446/268 |
| 8,064,487 B1 * | 11/2011 | Armstrong | H04M 3/42365 370/259 |
| 8,089,458 B2 | 1/2012 | Barney et al. | 345/158 |
| 8,221,220 B2 | 7/2012 | Ackley et al. | 463/23 |
| 8,287,383 B1 | 10/2012 | Etter | |
| 8,292,688 B2 | 10/2012 | Ganz | 446/175 |
| 9,131,339 B1 | 9/2015 | Kulfan | |
| 2005/0059483 A1 | 3/2005 | Borge | |
| 2007/0097832 A1 | 5/2007 | Koivisto | |

(Continued)

*Primary Examiner* — Michael Cuff
(74) *Attorney, Agent, or Firm* — Sheppard Mullin Richter & Hampton LLP

(57) ABSTRACT

This disclosure relates to a system configured to manage virtual content within a virtual space based on information associated with objects. The information associated with the objects may be updated responsive to detecting the objects at various real world physical geographic locations. The system may be configured to enhance a user's gaming experience by enabling location based unlocking of the virtual content in the virtual space. In some implementations, the locations may be locations such as but not limited to locations within theme parks, movie theaters, restaurants, and/or stores, for example. A user may be able to transport objects to one or more geographic locations where object identification devices detect the objects. Virtual content may be unlocked responsive to the detection of objects by the object identification devices.

25 Claims, 5 Drawing Sheets

(56) References Cited

U.S. PATENT DOCUMENTS

| | | | |
|---|---|---|---|
| 2008/0009351 A1 | 1/2008 | Ganz | |
| 2008/0062120 A1 | 3/2008 | Wheeler et al. | 345/156 |
| 2008/0167129 A1 | 7/2008 | Aaron | |
| 2008/0274811 A1 | 11/2008 | Ganz | |
| 2010/0076970 A1* | 3/2010 | Bates | A63F 13/12 707/736 |
| 2010/0130286 A1 | 5/2010 | Ackley | |
| 2010/0144434 A1 | 6/2010 | Leingang | |
| 2010/0162149 A1* | 6/2010 | Sheleheda | A63F 13/12 715/764 |
| 2010/0293473 A1 | 11/2010 | Borst | |
| 2010/0302143 A1* | 12/2010 | Spivack | A63F 13/12 345/157 |
| 2010/0304804 A1* | 12/2010 | Spivack | A63F 13/12 463/2 |
| 2011/0086702 A1 | 4/2011 | Borst | |
| 2011/0124399 A1 | 5/2011 | Dutilly | |
| 2011/0300941 A1 | 12/2011 | Weston et al. | 463/37 |
| 2012/0052953 A1 | 3/2012 | Annambhotla | |
| 2012/0129590 A1* | 5/2012 | Morrisroe | A63F 13/12 463/25 |
| 2012/0149475 A1 | 6/2012 | Schick | |
| 2012/0196682 A1 | 8/2012 | Xu | |
| 2012/0264518 A1 | 10/2012 | Rouille | |
| 2012/0276993 A1* | 11/2012 | Lerner | A63F 13/10 463/31 |
| 2012/0322548 A1 | 12/2012 | Isgreen | 463/29 |
| 2012/0323654 A1 | 12/2012 | Writer | 705/14.16 |
| 2013/0006735 A1 | 1/2013 | Koenigsberg | |
| 2013/0054422 A1 | 2/2013 | Desouza | |
| 2013/0072308 A1 | 3/2013 | Peck | |
| 2013/0095927 A1* | 4/2013 | Rietman | A63F 13/10 463/42 |
| 2013/0117377 A1* | 5/2013 | Miller | H04L 67/38 709/205 |
| 2013/0231193 A1 | 9/2013 | Heatherly | |
| 2014/0121008 A1 | 5/2014 | Canessa | |
| 2014/0273721 A1 | 9/2014 | Katan | |
| 2014/0274313 A1 | 9/2014 | Bala | |
| 2014/0349721 A1 | 11/2014 | Dawson | |

* cited by examiner

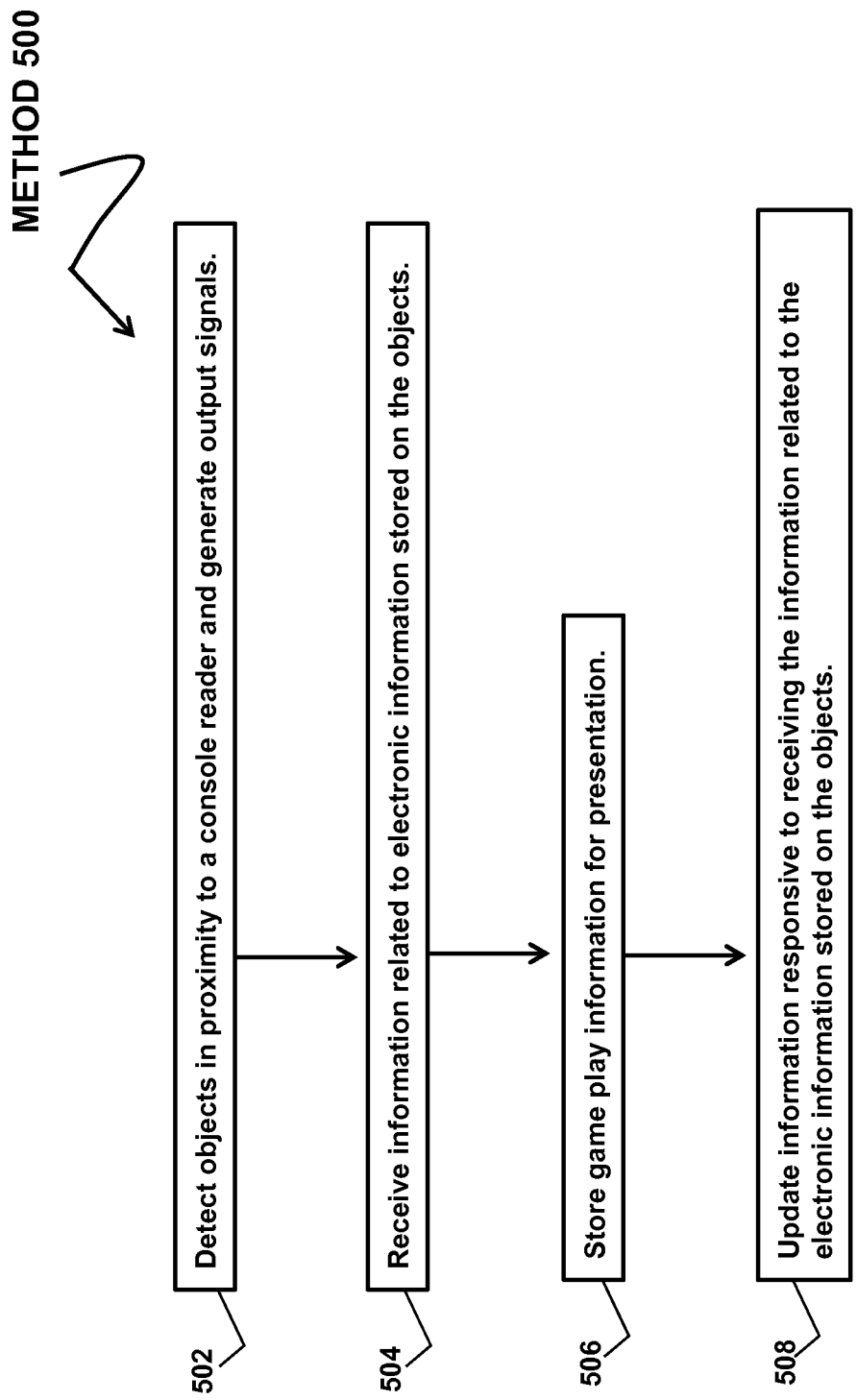

UNLOCKING OF VIRTUAL CONTENT THROUGH GEO-LOCATION

FIELD OF THE DISCLOSURE

This disclosure relates to a system configured to manage virtual content within a virtual space based on information associated with objects. The information associated with the objects may be updated responsive to detecting the objects at geographic locations.

BACKGROUND

Conventionally, various aspects of a virtual space may be managed. Such managing, however, may be typically based on a stage or level of completion of gameplay within the virtual space. The availability of specific user characters and/or non-user characters may generally also be dependent on a stage or level of completion of gameplay within the virtual space. Video gaming systems configured to update game information responsive to detecting a physical game piece in/on a reader are known. However, such information is typically related to previous game play.

SUMMARY

One aspect of the disclosure relates to a system configured to manage virtual content within a virtual space based on information associated with objects. The information associated with the objects may be updated responsive to detecting the objects at various real world physical geographic locations. The system may be configured to enhance a user's gaming experience by enabling geographic location based unlocking of the virtual content in the virtual space. In some implementations, the geographic locations may be locations such as but not limited to locations within theme parks, movie theaters, restaurants, stores, and/or in other locations, for example. A user may be able to transport objects to one or more geographic locations where object identification devices detect the objects. Virtual content may be unlocked responsive to the detection of objects by the object identification devices. In some implementations, the system may comprise objects, object identification devices, a server, a console system, a console reader, and/or other components.

The object identification devices may include a plurality of object identification devices associated with individual real world, geographic locations. The individual object identification devices may be configured to detect one or more objects present at the geographic locations. The objects may be associated with virtual entities in the virtual space. The objects may include, for example, a first object associated with a first entity. The identification devices may include, for example, a first identification device associated with a first geographic location.

In some implementations, the server may include one or more processors configured to execute computer program modules. The computer program modules may comprise a user module, a communication module, an update module, and/or other modules.

The user module may be configured to maintain user accounts associated with individual users in the virtual space. The user accounts may include information related to the entities in the virtual space. The user accounts may include, for example, a first user account associated with a first user. The first user account may include information related to the first entity, for example.

The communication module may be configured to receive indications that the objects have been detected by the object identification devices.

The update module may be configured to update the information related to the entities in the virtual space responsive to detection of the associated objects by the identification devices. For example, responsive to reception of a first indication indicating that the first object has been detected by the first identification device associated with the first geographic location, the information associated with the first entity may be updated in the virtual space to reflect the first indication.

In some implementations, one or more of the plurality of object identification devices may be located in locations such as but not limited to locations within a theme park, a movie theater, a restaurant, a store, and/or in other locations. In some implementations, the user module may be configured such that the information in the user accounts is stored electronically on the system server. In some implementations, the update module may be configured such that the information associated with the entities in the virtual space is updated such that additional content associated with the entities in the virtual space is unlocked. The additional content associated with the entities in the virtual space may comprise one or more of skills, languages, powers, quests, pets, levels, rides, weapons, characters, mini-games, movie previews, virtual goods, or scenes, for example.

In some implementations, the object identification devices may be configured to detect a plurality of individual objects together responsive to the objects being in the same geographic location at the same time. The plurality of individual objects may include, for example, the first object associated with the first entity and a second object associated with a second entity. The first identification device associated with the first geographic location may be configured to detect the first object and the second object together responsive to the first object and the second object being in the first geographic location at the same time. The update module may be configured to update information associated with multiple entities in the virtual space based on the detection of the plurality of individual objects together at the geographic locations associated with the identification devices such that the information associated with the first entity is updated in the virtual space based on detection of the first object with the second object by the first identification device associated with the first geographic location, and the information associated with the second entity is updated in the virtual space based on detection of the second object with the first object by the first identification device associated with the first geographic location. The update module may be configured such that the information associated with the multiple entities is updated such that additional content associated with the multiple entities in the virtual space is unlocked. The additional content associated with the multiple entities in the virtual space may comprise one or more of a group activity, a game, a scavenger hunt, or a movie preview, for example.

In some implementations, the update module may be configured such that the unlocked additional content is determined stochastically. The stochastic determination may be based on one or more of the objects present at a given object identification device, a combination of individual objects present together at the given object identification device, the geographic location of the given object identification device, and/or other factors.

In some implementations, the system may be configured to update electronic information stored on the objects themselves responsive to the objects being detected by the object identification devices in the geographic locations. The electronic information stored on the objects may be updated in addition to and/or instead of the electronic information stored by the server and/or other devices.

In some embodiments, the object identification devices may include one or more processors configured to execute computer program modules. The computer program modules may comprise an object communication module, an object update module, and/or other modules. The object communication module may be configured to receive indications that the objects have been detected by the object identification devices. The object update module may be configured to update the information stored on the objects responsive the detection of the objects by the identification devices. For example, responsive to reception of a first indication indicating that the first object has been detected by the first identification device associated with the first geographic location, the object update module may update information stored on the first object associated with the first entity.

As described above, the system may include console systems, a console reader, and/or other components. In some implementations, "console" may refer to a video game system, a desktop computer, a laptop computer, a tablet computer, a handheld computer, a NetBook, a Smartphone, and/or other computing platforms. "Console" may refer one or more present and/or future near field communication (NFC) enabled devices. The console reader may be configured to detect objects in proximity to the reader, read the electronic information stored on the objects, and generate output signals conveying information related to the electronic information stored on the objects. The electronic information stored on the objects may include information related to the objects being previously detected in geographic locations. The console systems may include one or more processors configured to execute computer program modules. The computer program modules may comprise a console communication module, a game content module, a console update module, and/or other modules.

The console communication module may be configured to receive the information related to the electronic information stored on the objects via the output signals.

The game content module may be configured to store game play information for presentation in the virtual space. The game play information may include sets of geographic location content associated with the geographic locations such that a first set of geographic location content is associated with a first geographic location, for example.

The console update module may be configured to, responsive to the console communication module receiving the information related to the electronic information stored on the objects, update information related to the entities in the virtual space based on the information stored on the objects. Updating the information may comprise unlocking one or more of the sets of geographic location content that correspond to the geographic locations where the objects were previously detected. For example, updating information related to the first entity may comprise unlocking the first set of geographic location content associated with the first geographic location responsive to the console communication module receiving information related to the first object being previously detected in the first geographic location.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 5 illustrates a third method for managing virtual content within a virtual space based on information associated with objects.

DETAILED DESCRIPTION

Figure 1:
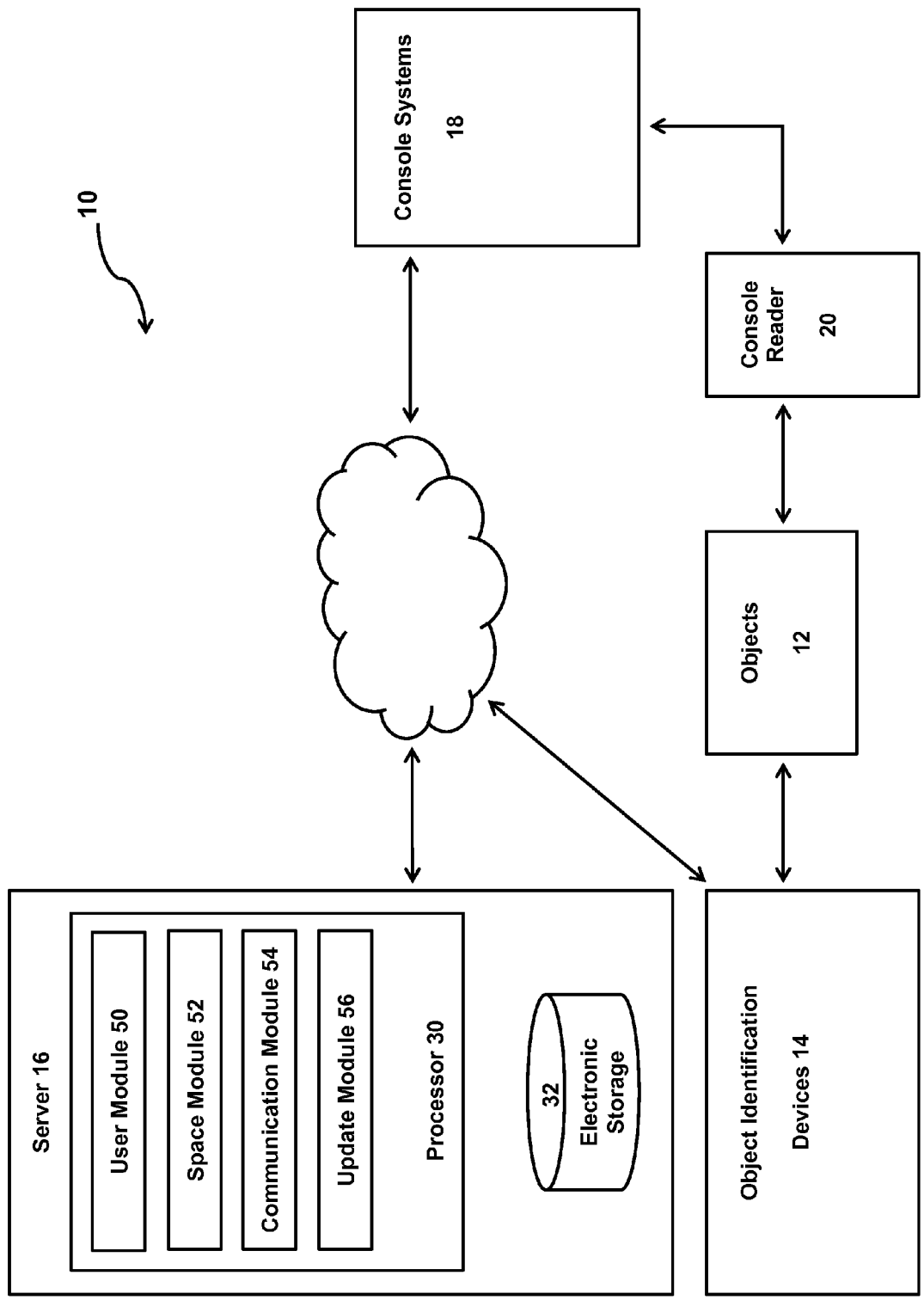
FIG. 1 illustrates a system configured to manage virtual content within a virtual space based on information associated with objects.

FIG. 1 illustrates a system 10 configured to manage virtual content within a virtual space based on information associated with objects 12. The information associated with the objects may be updated responsive to detecting the objects at various real world physical geographic locations. System 10 may be configured to enhance a user's gaming experience by enabling geographic location based unlocking of the virtual content in the virtual space. The virtual content may include, for example, mini games, virtual goods and/or other digital content. In some implementations, the geographic locations may be locations such as but not limited to locations within theme parks, movie theaters, restaurants, stores, and/or other locations, for example. A user may be able to transport objects 12 to one or more geographic locations where object identification devices 14 detect objects 12. Virtual content may be unlocked responsive to the detection of objects 12 by the object identification devices 14. In some implementations, system 10 may comprise objects 12, object identification devices 14, a server 16, a console system 18, a console reader 20, and/or other components.

Objects 12 may be standalone physical objects. Objects 12 may be associated with virtual entities in the virtual space. The virtual entities may comprise virtual games, virtual characters, powers, abilities and/or skills that can be applied to the virtual characters, virtual objects, simulated physical phenomena, and/or other virtual content. Individual objects 12 may be configured to be detectable by object identification devices 14. In some implementations, a given object 12 may be configured to depict a given character (e.g., Mickey Mouse). The given object 12 may be a toy figurine embodying the appearance of the given character. The toy figurine may be configured to be detected by object identification devices 14. In some implementations, objects 12 may be disposed upon object identification devices 14 in order to be detected. In some implementations, detection of a given object 12 may be based on a shape of a portion of the given object 12. In some implementations, a given object 12 may be detectable based on a given signal conveying information associated with the given object 12. Detection of a given object 12 may be facilitated by electronics embedded within or otherwise included in the given object 12. For example, the given object 12 may include a radio-frequency identification (RFID) chip configured to emit radio-frequency electromagnetic fields responsive to the given object 12 being disposed in proximity to one or more object identification devices 14. The description of the form factor of objects 12 is not intended to be limiting. Objects 12 may have any form factor (e.g., a coin, a lanyard, a key, an identification card) provided they function as described herein. Objects 12 may include a first object associated with a first entity.

Object identification devices 14 may be associated with individual real world, geographic locations. Object identification devices 14 may be configured to detect one or more objects 12 present at the geographic locations. In some implementations, one or more of the geographic locations may be such as but not limited to locations within a theme park, a movie theater, a restaurant, a store, and/or in other locations. In some implementations, object identification devices 14 may include physical kiosks, and/or other physical equipment substantially permanently located in the geographic locations. In some implementations, object identification devices 14 may include mobile devices configured with appropriate hardware (e.g., a GPS sensor) and/or software (e.g., imaging software, scanning software) for detecting objects 12 present in the geographic locations. Object identification devices 14 may include a first identification device associated with a first geographic location.

In some implementations, object identification devices 14 may be configured to detect a plurality of individual objects 12 together in the geographic locations. Object identification devices 14 may be configured to detect the plurality of objects 12 responsive to objects 12 being in the same geographic location at the same time. The plurality of individual objects may include the first object associated with the first entity and a second object associated with a second entity. The first identification device associated with the first geographic location may be configured to detect the first object and the second object together responsive to the first object and the second object being in the first geographic location at the same time.

Server 16 may comprise a processor 30, electronic storage 32, and/or other components. As shown in FIG. 1, processor 30 may be configured to execute one or more computer program modules. The computer program modules may comprise one or more of a user module 50, a space module 52, a communication module 54, an update module 56, and/or other modules.

User module 50 may be configured to maintain user accounts associated with individual users in the virtual space. The user accounts may include information related to the entities in the virtual space. The user accounts may include a first user account associated with a first user. The first user account may include information related to the first entity. The user module may be configured such that the information in the user accounts is stored electronically on server 16 (e.g., in electronic storage 32) and/or in other locations.

Space module 52 may be configured to implement the virtual space to determine views of the virtual space. In some implementations, the views may then be communicated (e.g., via streaming, via object/position data, and/or other information) from server(s) 16 to console system(s) 18 for presentation to users. The view determined and presented to a given user may correspond to an entity being controlled by the given user. The entity being controlled by the given user may correspond to one or more objects 12 on and/or in proximity to console reader 20. The view determined and presented to the given user may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The virtual space may comprise a simulated space that is accessible by users via console system(s) 18 and/or other client devices that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of the virtual space are determined by space module 52 is not intended to be limiting. Space module 52 may be configured to express the virtual space in a more limited, or richer, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic game graphic with a textual description of the opponents. Other expressions of individual places within the virtual space are contemplated.

Within the instance(s) of the virtual space executed by space module 52, users may control the entities (e.g., user characters, objects, simulated physical phenomena, and/or other elements) within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements (e.g., entities, user characters, avatars) in the virtual space. Control may be exercised by placing individual objects 12 in, on, and/or in proximity to console reader 20, and/or through control inputs and/or commands input by the users through console systems 18 and/or other client devices. The users may interact with each other through communications exchanged within the virtual space. Such communications may include one or more of textual chat, instant messages, private messages, voice communications, and/or other communications. Communications may be received and entered by the users via their respective console systems 18. Communications may be routed to and from the appropriate users through space module 52.

Communication module 54 may be configured to receive indications that objects 12 have been detected by object identification devices 14. Communication module 54 may be configured such that the indications comprise information related to output signals from object identification devices 14. Information related to the output signals of object identification devices 14 may comprise information related to individual ones of objects 12, a quantity of objects 12, users associated with objects 12, virtual characters associated with objects 12, geographic locations of object identification devices 14, and/or other information. Communication module 54 may be configured to receive the indications that objects 12 have been detected by object identification devices 14 via a wireless and/or wired network.

Update module 56 may be configured to update the information related to the entities in the virtual space. Update module 56 may be configured to update the information responsive to detection of the associated objects 12 by identification devices 14. Update module 56 may be configured such that the information associated with the entities in the virtual space is updated such that additional content associated with the entities in the virtual space is unlocked. Update module 56 may be configured such that additional content associated with the entities in the virtual space comprises one or more of skills, languages, powers, quests, pets, levels, rides, weapons, characters, mini-games, movie previews, virtual goods, scenes, and/or other content. For example, responsive to reception of a first indication indicating that the first object has been detected by the first identification device associated with the first geographic location, the information associated with the first entity is updated in the virtual space to reflect the first indication.

In some implementations, update module 56 may be configured to update information associated with multiple entities in the virtual space based on detection of a plurality of individual objects 12 together at the geographic locations associated with identification devices 14. For example, the information associated with the first entity may be updated in the virtual space based on detection of the first object with the second object by the first identification device associated with the first geographic location. The information associated with the second entity may be updated in the virtual space based on detection of the second object with the first object by the first identification device associated with the first geographic location. Update module 56 may be configured such that the information associated with the multiple entities is updated such that additional content associated with the multiple entities in the virtual space is unlocked. The additional content associated with the multiple entities in the virtual space may include one or more of a group activity, a game, a scavenger hunt, a movie preview, and/or other content.

In some implementations, update module 56 may be configured such that the unlocked additional content is determined stochastically. The stochastic determination may be based on one or more of objects 12 present at a given object identification device 14, a specific combination of individual objects 12 present together at the given object identification device 14, the geographic location of the given object identification device 14, and/or other information.

A given console system 18 may include one or more processors configured to execute computer program modules. The computer program modules may be configured to enable an expert and/or user associated with the given console system 18 to interface with system 10, console reader 20, and/or other external resources, and/or provide other functionality attributed herein to console systems 18. By way of non-limiting example, the given console system 18 may include one or more of a video game system (e.g., Microsoft Xbox), a desktop computer, a laptop computer, a tablet computer, a handheld computer, a NetBook, a Smartphone, and/or other computing platforms. Console system 18 may include one or more present and/or future near field communication (NFC) enabled devices.

Console reader 20 may be configured to detect objects 12 in proximity to reader 20. In some implementations, console reader 20 may be configured to detect a plurality of individual objects 12 together responsive to the plurality of objects 12 being in proximity to reader 20 at the same time. The plurality of individual objects 12 may include the first object associated with the first entity, and the second object associated with a second entity, for example. Console reader 20 may be configured such that the first object and the second object are detected together responsive to the first object and the second object being in proximity to console reader 20 at the same time.

In some implementations, console reader 20 may be configured to provide a first signal responsive to one or more of (1) the first object abutting a portion of console reader 20, (2) the object being placed in proximity to console reader 20, and/or other actions configured to facilitate detection of the first object. In some implementations, console reader 20 may be a peripheral device configured to be communicatively coupled with one or more components of system 10 (e.g., console systems 18). In some implementations, console reader 20 may be integrated so as to form a singular device with a component of system 10 (e.g., console systems 18).

In some implementations, space module 52 may be configured to implement the virtual space to determine views of the virtual space based on the individual objects 12 detected by the console reader and/or the information updated by update module 56. For example, update module 56 may update the information associated with the first object responsive to the first object being detected in the first geographic location by the first object identification device. The first object may be transported by a user (for example) to console reader 20 in the home (for example) of the user. Responsive to console reader 20 detecting the first object in proximity to reader 20, space module 52 may be configured to implement the virtual space to determine views of the virtual space that reflect that the first object had been previously detected in the first geographic location by the first object identification device.

Figure 2:
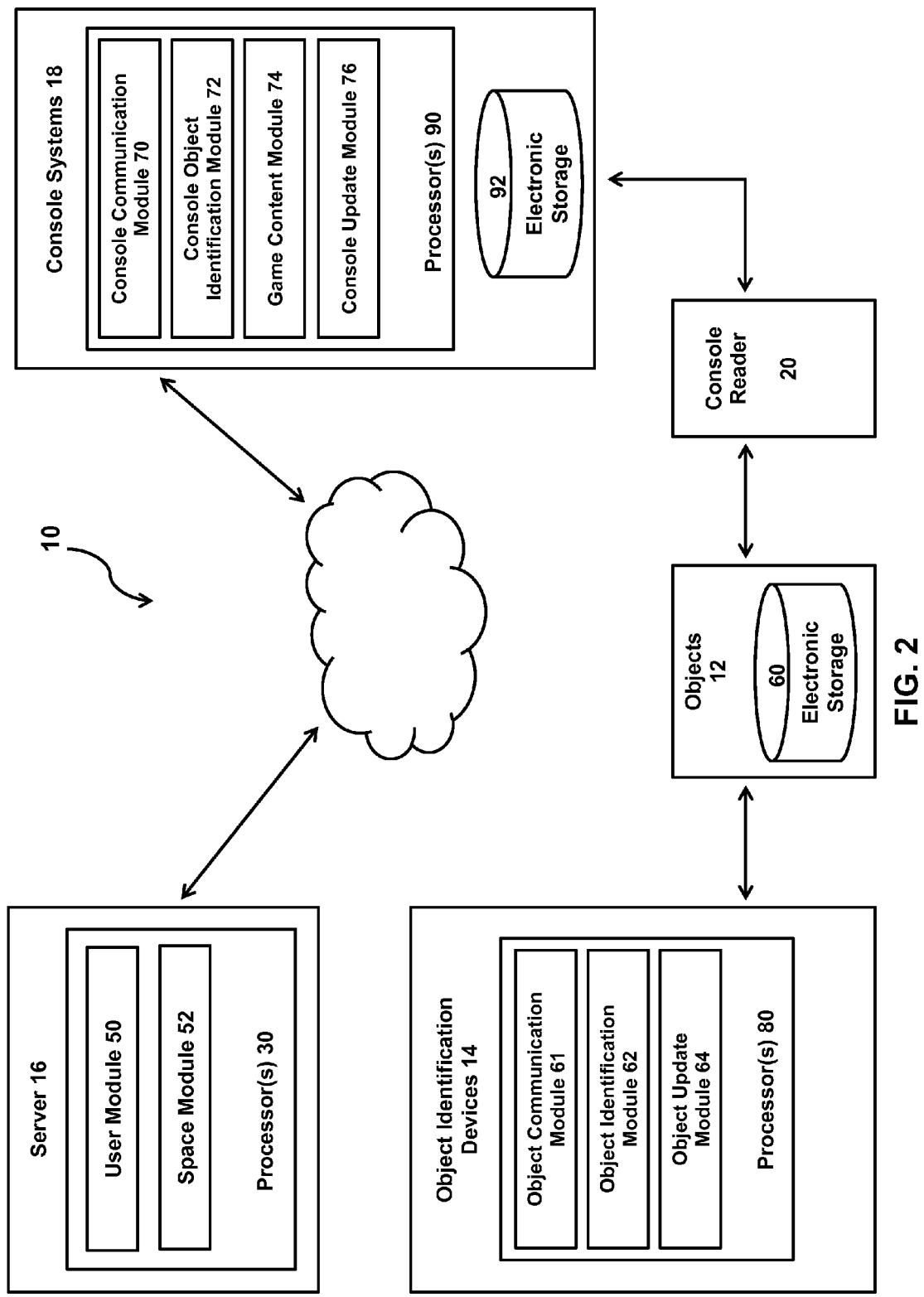
FIG. 2 illustrates a second implementation of a system configured to manage virtual content within a virtual space based on information associated with objects.

In some implementations, system 10 may be configured to update electronic information stored on objects 12 responsive to objects 12 being detected by object identification devices 14 in the geographic locations. For example, FIG. 2 is a schematic illustration of an implementation of system 10 wherein electronic information stored on objects 12 is updated. The electronic information stored on objects 12 may be updated in addition to and/or instead of the electronic information stored by server 16 and/or other devices (described above relative to FIG. 1). The schematic illustrations of system 10 shown in FIG. 1 and/or FIG. 2 are not intended to be limiting. The electronic information and/or the updated electronic information may be stored on server 16, objects 12, and/or other devices provided the electronic information is updated responsive to object identification devices 14 detecting objects 12 in the geographic locations. The functionality of the modules described relative to FIG. 1 above, and/or FIG. 2 below, may be performed by any one of the modules shown in FIG. 1 and/or FIG. 2 on any one of the devices shown in FIG. 1 and/or FIG. 2. In some implementations, the functionality of the modules described relative to FIG. 1 and/or FIG. 2 may be performed by modules not shown in FIG. 1 and/or FIG. 2, and/or by devices not shown in FIG. 1 and/or FIG. 2.

Referring to FIG. 2, objects 12 may include electronic storage 60. The electronic information stored in electronic storage 60 may include object 12 identification information, information related to the virtual entities associated with objects 12, information related to a given character (e.g., Mickey Mouse) depicted by objects 12, information related to objects 12 being previously detected in geographic locations, information related to objects 12 being previously detected in geographic locations with other individual objects 12, and/or other information.

Processors 80 may be configured to provide information processing capabilities in object identification devices 14. As shown in FIG. 2, processors 80 may be configured to execute one or more computer program modules. The computer program modules may comprise one or more of an object communication module 61, an object identification module 62, an object update module 64, and/or other modules.

Object communication module 61 may be configured to receive indications that the objects have been detected by object identification devices 14. Object communication module 61 may be configured such that the indications comprise information related to output signals from objects 12. Detection of a given object 12 may be facilitated by electronics embedded within or otherwise included in the given object 12. As described above, for example, the given object 12 may include a radio-frequency identification (RFID) chip configured to emit radio-frequency electromagnetic fields responsive to the given object 12 being in proximity to one or more object identification devices 14 (e.g., placed in proximity by a user). In some implementations, detection of a given object 12 may be based on a form factor of objects 12 and/or a shape of a portion of a given object 12.

Object identification module 62 may be configured to receive individual identifiers from individual objects 12 that identify individual objects 12 responsive to individual objects 12 being detected. For example, responsive to the first indication indicating that the first object has been detected by the first identification device, object identification module 62 may receive a first identifier from the first object. The identifiers may be included in information conveyed by the outputs signals from objects 12, information conveyed by the shape of objects 12, and/or conveyed by other methods.

Object update module 64 may be configured to update the information stored on objects 12 responsive to the detection of objects 12 by identification devices 14. For example, responsive to reception of a first indication indicating that the first object has been detected by the first identification device associated with the first geographic location, object update module 64 may update information stored on the first object that is associated with the first entity. In some implementations, object update module 64 may be configured to update the information stored on objects 12 based on the individual identifiers. The information stored on the first object may be updated based on the first identifier. In some implementations, object update module 64 may be configured such that the information stored on objects 12 is updated to include information configured to facilitate unlocking the virtual content associated with the entities in the virtual space (similar to update module 56 described with respect to server 16 in FIG. 1 above). For example, the information stored on the first object associated with the first entity may be updated to include information configured to facilitate unlocking virtual content associated with the first entity in the virtual space.

In some implementations, object update module 64 may be configured to update the information stored on objects 12 responsive to the detection of the plurality of individual objects 12 together at the geographic locations associated with identification devices 14. For example, the information stored on the first object associated with the first entity may be updated based on the detection of the first object with the second object by the first identification device associated with the first geographic location. In some implementations, object update module 64 may be configured such that the information stored on objects 12 is updated to include information configured to facilitate unlocking content associated with multiple entities in the virtual space. In some implementations, object update module 64 may be configured such that the information configured to facilitate unlocking content associated with multiple entities in the virtual space is determined stochastically (similar to update module 56 described with respect to server 16 in FIG. 1 above).

In the implementation shown in FIG. 2, system 10 includes server 16 and processor 30. In this implementation, processor 30 may be configured to execute user module 50 and space module 52 as described above (relative to FIG. 1).

Console reader 20 may be configured to detect objects 12 in proximity to reader 20. Console reader 20 may be configured to read the electronic information stored on objects 12 and generate output signals conveying information related to the electronic information stored on objects 12. The electronic information stored on objects 12 may include information related to objects 12 being previously detected in geographic locations. In some implementations, console reader 20 may be configured to detect a plurality of individual objects 12 together responsive to the plurality of objects 12 being in proximity to reader 20 at the same time. Console reader 20 may be configured to read the electronic information stored on the plurality of individual objects 12 at substantially the same time.

As shown in FIG. 2, console systems 18 may include processors 90 configured to provide information processing capabilities in console systems 18. Processors 90 may be configured to execute computer program modules. The computer program modules may include a console communication module 70, a console object identification module 72, a game content module 74, a console update module 76, and/or other modules.

Console communication module 70 may be configured to receive the information related to the electronic information stored on the objects via the output signals from console reader 20, objects 12, and/or from other sources. The output signals from console reader 20 may indicate that one or more objects 12 have been detected by console reader 20.

Console object identification module 72 may be configured to receive individual identifiers from individual objects 12 that identify the individual objects 12 responsive to the individual objects being detected by console reader 20. For example, responsive to the first object being detected by console reader 20, console object identification module 72 may receive a first identifier from the first object.

Game content module 74 may be configured to store game play information for presentation in the virtual space. The game play information may include sets of geographic location content associated with the geographic locations. For example, a first set of geographic location content may be associated with a first geographic location. In some implementations, game content module 74 may be configured to store the game play information in electronic storage 92, and/or in other locations.

Console update module 76 may be configured to, responsive to console communication module 70 receiving the information related to the electronic information stored on objects 12, update information related to the entities in the virtual space based on the information stored on objects 12. In some implementations, updating the information may comprise unlocking one or more of the sets of geographic location content that correspond to the geographic locations where the objects were previously detected. For example, updating information related to the first entity may comprise unlocking the first set of geographic location content associated with the first geographic location responsive to the console communication module receiving information related to the first object being previously detected in the first geographic location. Console update module 76 may be configured to update the information related to the entities in the virtual space based on the individual identifiers received from the individual objects 12 by console object identification module 72. For example, console update module may update the information related to the first entity based on the first identifier. In some implementations, console update module 76 may be configured such that the updated information related to the entities in the virtual space may be determined stochastically. The stochastic determination may be based on the information from the individual objects 12 detected together at console reader 20. In some implementations, console update module 76 may be configured such that the stochastic determination is based on the information related to individual objects 12 being previously detected in geographic locations with other individual objects 12.

As shown in FIG. 1 and FIG. 2, processors 30, 80, and/or 90 are configured to provide information processing capabilities in system 10. As such, processors 30, 80 and/or 90 may comprise one or more of a digital processor, an analog processor, a digital circuit designed to process information, an analog circuit designed to process information, a state machine, and/or other mechanisms for electronically processing information. Although processors 30, 80, and/or 90 are shown in FIG. 1 as single entities, this is for illustrative purposes only. In some implementations, processors 30, 80, and/or 90 may each comprise a plurality of processing units. These processing units may be physically located within the same device (e.g., object identifications devices 14), or processors 30, 80, and/or 90 may represent processing functionality of a plurality of devices operating in coordination.

Processors 30, 80 and/or 90 may be configured to execute their associated modules, and/or other modules by software; hardware; firmware; some combination of software, hardware, and/or firmware; and/or other mechanisms for configuring processing capabilities on processors 30, 80, and/or 90.

It should be appreciated that although the three sets of modules (50-56, 61-64, and 70-76) are illustrated in FIG. 1 and FIG. 2 as being co-located within single processing units 30, 80, and/or 90, in implementations in which processors 30, 80, and/or 90 comprise multiple processing units, one or more of the modules in a set of modules may be located remotely from the other modules in the set. The description herein of the functionality provided by the different modules is for illustrative purposes, and is not intended to be limiting, as any of the modules may provide more or less functionality than is described. For example, one or more of the modules may be eliminated, and some or all of its functionality may be provided by other modules. As another example, processor 30 (FIG. 1) may be configured to execute one or more additional modules that may perform some or all of the functionality attributed below to one of modules 50, 52, 54, and/or 56.

As shown in FIG. 1 and FIG. 2, in some implementations, electronic storage 32, 60, and/or 92 may comprise electronic storage media that electronically stores information. The electronic storage media of electronic storage 32, 60, and/or 92 may comprise one or both of system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 32, 60, and/or 92 may comprise one or more of optically readable storage media (e.g., optical disks, etc.), magnetically readable storage media (e.g., magnetic tape, magnetic hard drive, floppy drive, etc.), electrical charge-based storage media (e.g., EPROM, RAM, etc.), solid-state storage media (e.g., flash drive, etc.), and/or other electronically readable storage media. Electronic storage 32, 60, and/or 92 may store software algorithms, information determined by processors 30, 80, and/or 90, and/or other information that enables system 10 to function properly. Electronic storage 32, 60, and/or 92 may be (in whole or in part) a separate component within system 10, or electronic storage 32, 60, and/or 92 may be provided (in whole or in part) integrally with one or more other components of system 10 (e.g., server 16, objects 12, console systems 18, etc.).

Figure 3:
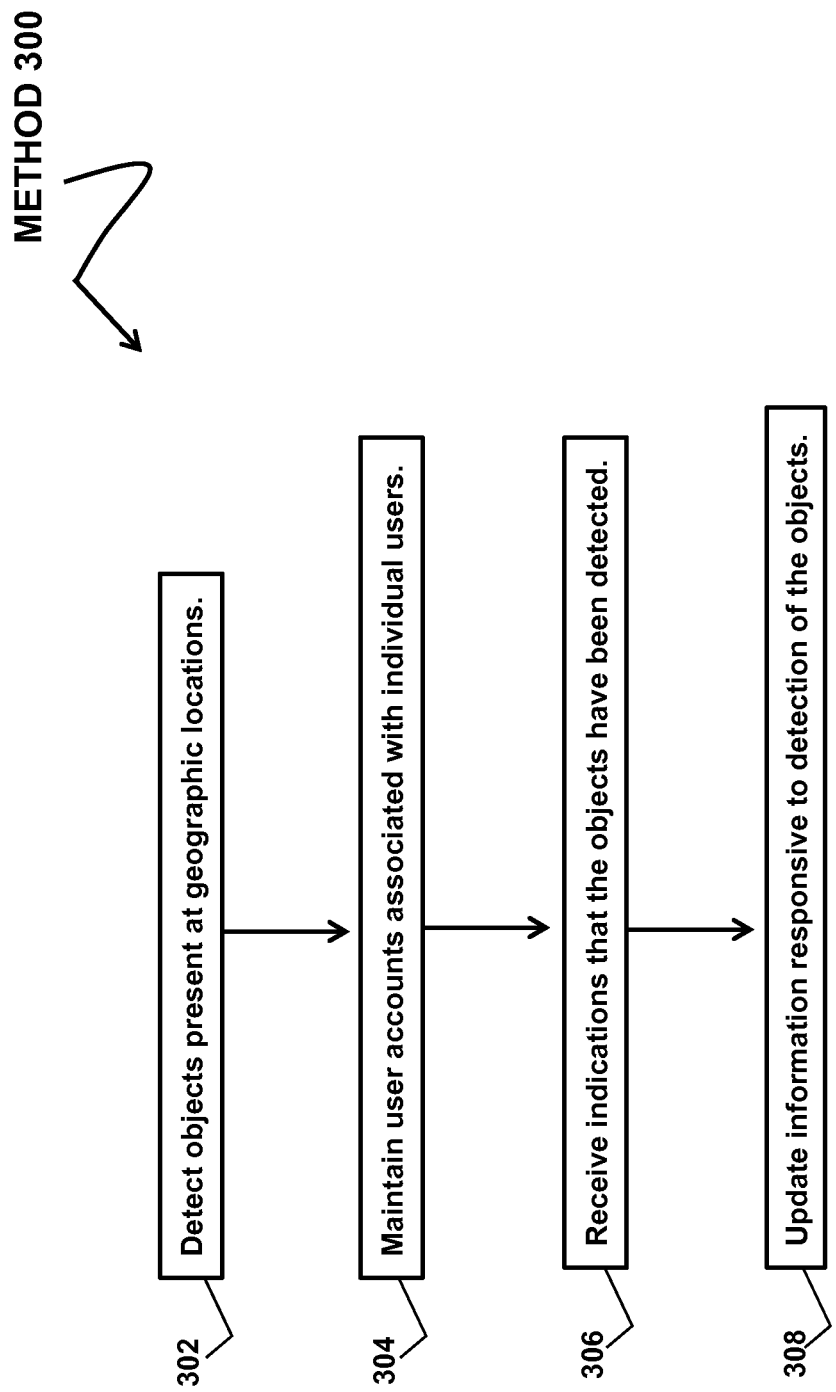
FIG. 3 illustrates a method for managing virtual content within a virtual space based on information associated with objects.
Figure 4:
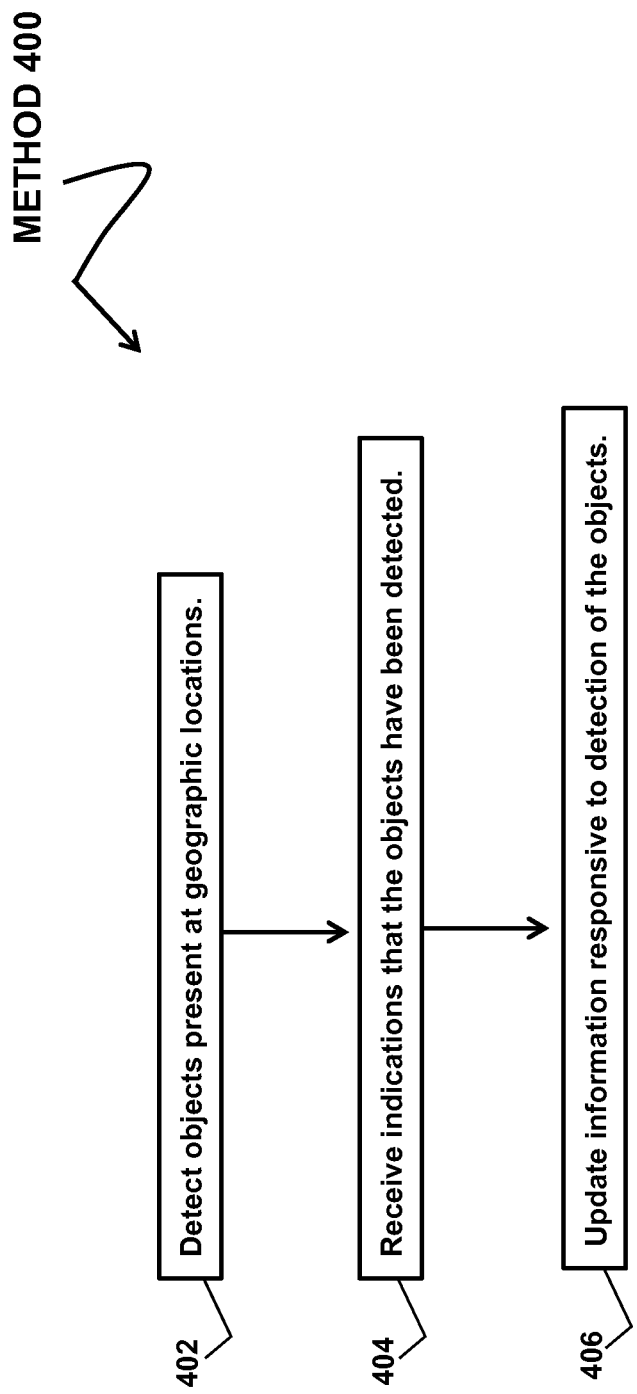
FIG. 4 illustrates a second method for managing virtual content within a virtual space based on information associated with objects.

FIG. 3-5 illustrate methods 300, 400, and 500 for managing virtual content within a virtual space based on information associated with objects, in accordance with one or more implementations. The operations of method 300, 400, and/or 500 presented below are intended to be illustrative. In some implementations, method 300, 400, and/or 500 may be accomplished with one or more additional operations not described, and/or without one or more of the operations discussed. Additionally, the order in which the operations of method 300, 400, and/or 500 are respectively illustrated in FIG. 3, FIG. 4, and FIG. 5, and described below is not intended to be limiting.

In some implementations, method 300, 400, and/or 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300, 400, and/or 500 in response to instructions stored electronically on an electronic storage medium. The one or more processing devices may include one or more devices configured through hardware, firmware, and/or software to be specifically designed for execution of one or more of the operations of method 300, 400, and/or 500.

Referring to FIG. 3 and method 300, at an operation 302, one or more objects may be detected at geographic locations. A plurality of object identification devices may be associated with individual real world, geographic locations. The individual object identification devices may be configured to detect one or more objects present at the geographic locations. The objects may be associated with virtual entities in a virtual space. The objects may include a first object associated with a first entity. The identification devices may include a first identification device associated with a first geographic location. Operation 302 may be performed by an object identification device that is the same as or similar to object identification device 14 (shown in FIG. 1 and described herein), in accordance with one or more implementations.

At an operation 304, user accounts associated with individual users may be maintained. The user accounts may be associated with individual users in the virtual space. The user accounts may include information related to the entities in the virtual space. The user accounts may include a first user account associated with a first user. The first user account may include information related to the first entity. Operation 304 may be performed by a user module that is the same as or similar to user module 50 (shown in FIG. 1 and described herein), in accordance with one or more implementations.

At an operation 306, indications that the objects have been detected may be received. Operation 306 may be performed by a communication module that is the same as or similar to communication module 54 (shown in FIG. 1 and described herein), in accordance with one or more implementations.

At an operation 308, information may be updated responsive to detection of the objects. The information may be related to the entities in the virtual space. The information may be updated responsive to detection of the associated objects by the identification devices such that, responsive to reception of a first indication indicating that the first object has been detected by the first identification device associated with the first geographic location, the information associated with the first entity is updated in the virtual space to reflect the first indication. Operation 308 may be performed by an update module that is the same as or similar to update module 56, in accordance with one or more implementations.

Referring to FIG. 4 and method 400, at an operation 402 one or more objects may be detected at geographic locations. A plurality of object identification devices may be associated with individual real world, geographic locations. The individual object identification devices may be configured to detect one or more of the objects present at the geographic locations. The identification devices may include a first identification device associated with a first geographic location. In some implementations, operation 402 may be performed by object identification devices the same as or similar to object identification devices 14 (shown in FIG. 2 and described herein), in accordance with one or more implementations.

At an operation 404, indications that the objects have been detected may be received. In some implementations, operation 404 may be performed by an object communication module the same as or similar to object communication module 60 (shown in FIG. 2 and described herein), in accordance with one or more implementations.

At an operation 406, responsive to detection of the objects, information may be updated. The information may be stored on the objects. The information may be updated responsive the detection of the objects by the identification devices such that, responsive to reception of a first indication indicating that the first object has been detected by the first identification device associated with the first geographic location, the information stored on the first object associated with the first entity is updated. In some implementations, operation 406 may be performed by an object update module the same as or similar to object update module 64 (shown in FIG. 2 and described herein), in accordance with one or more implementations.

Referring to FIG. 5 and method 500, at an operation 502, objects in proximity to a console reader may be detected. The console reader may be configured to detect objects in proximity to the reader, read electronic information stored on the objects, and generate output signals conveying information related to the electronic information stored on the objects. The electronic information stored on the objects including information related to the objects being previously detected in geographic locations. In some implementations, operation 502 may be performed by a console reader the same as or similar to console reader 20 (shown in FIG. 2 and described herein), in accordance with one or more implementations.

At an operation 504, information related to the electronic information stored on the objects may be received. In some implementations, operation 504 may be performed by an console communication module the same as or similar to console communication module 70 (shown in FIG. 2 and described herein), in accordance with one or more implementations.

At an operation 506, game play information may be stored for presentation. The game play information may include sets of geographic location content associated with the geographic locations such that a first set of geographic location content is associated with a first geographic location. In some implementations, operation 506 may be performed by a game content module the same as or similar to game content module 72 (shown in FIG. 2 and described herein), in accordance with one or more implementations.

At an operation 508, information related to entities in the virtual space associated with the objects may be updated responsive to receiving the information related to the electronic information stored on the objects. The update may be based on the information stored on the objects. Updating the information may comprise unlocking one or more of the sets of geographic location content that correspond to the geographic locations where the objects were previously detected. Updating information related to a first entity associated with the first object may comprise unlocking the first set of geographic location content associated with the first geographic location responsive to the console communication module receiving information related to the first object being previously detected in the first geographic location. In some implementations, operation 508 may be performed by a console update module the same as or similar to console update module 74 (shown in FIG. 2 and described herein), in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to manage virtual content within a virtual space based on information associated with objects, the information associated with the objects being updated responsive to detecting the objects at geographic locations, the system comprising:

one or more object identification devices, individual object identification devices being associated with individual real-world geographic locations, the individual object identification devices being configured to detect one or more objects present at the geographic locations, individual objects being associated with individual virtual entities in the virtual space based on the individual objects embodying individual physical appearances of individual associated virtual entities, the virtual space being accessible via one or more computing platforms, the one or more computing platforms being separate and distinct from the one or more objects, the one or more objects including a first object associated with a first virtual entity, the first object being associated with the first virtual entity based on the first object embodying a physical appearance of the first virtual entity, the one or more object identification devices including a first identification device associated with a first geographic location; and one or more physical processors configured by machine-readable instructions to:

maintain user accounts associated with individual users of the virtual space, the user accounts including information defining the virtual entities in the virtual space, the user accounts including a first user account associated with a first user, the first user account including information defining the first virtual entity;

receive indications that individual objects have been detected by the one or more object identification devices; and update the information defining the individual virtual entities in the virtual space in the user accounts responsive to detection of the associated individual objects by the one or more object identification devices such that, responsive to reception of a first indication indicating that the first object has been detected by the first identification device associated with the first geographic location, the information associated with the first virtual entity in the first user account is updated to reflect the first indication.

2. The system of claim 1, wherein individual object identification devices are located within one or more of a theme park, a restaurant, a movie theater, or a store.

3. The system of claim 1, wherein the one or more physical processors are further configured by machine-readable instructions to effectuate storage of the information in the user accounts on a system server.

4. The system of claim 1, wherein the one or more physical processors are further configured by machine-readable instructions such that the information associated with the virtual entities in the virtual space is updated such that additional content associated with the virtual entities in the virtual space is unlocked.

5. The system of claim 4, wherein the one or more physical processors are further configured by machine-readable instructions such that additional content associated with the virtual entities in the virtual space comprises one or more of skills, languages, powers, quests, pets, levels, rides, weapons, characters, mini-games, movie previews, virtual goods, or scenes.

6. The system of claim 1, wherein the individual object identification devices are configured to detect a plurality of individual objects together responsive to the objects being in the same geographic location at the same time, wherein the plurality of individual objects include the first object associated with the first virtual entity and a second object associated with a second virtual entity, and wherein the first identification device associated with the first geographic location is configured to detect the first object and the second object together responsive to the first object and the second object being in the first geographic location at the same time.

7. The system of claim 6, wherein the one or more physical processors are further configured by machine-readable instructions to update information associated with multiple virtual entities in the virtual space based on the detection of the plurality of individual objects together at the geographic locations associated with the identification devices such that:

the information associated with the first virtual entity is updated in the virtual space based on detection of the first object with the second object by the first identification device associated with the first geographic location, and the information associated with the second virtual entity is updated in the virtual space based on detection of the second object with the first object by the first identification device associated with the first geographic location.

8. The system of claim 7, wherein the one or more physical processors are further configured by machine-readable instructions such that the information associated with the multiple virtual entities is updated such that additional content associated with the multiple virtual entities in the virtual space is unlocked, the additional content associated with the multiple entities in the virtual space comprising one or more of a group activity, a game, a scavenger hunt, a skill, a language, a power, a quest, a pet, a level, a ride, a weapon, a character, a mini-game, virtual goods, a scene, or a movie preview.

9. The system of claim 8, wherein the one or more physical processors are further configured by machine-readable instructions such that the unlocked additional content is determined stochastically, the stochastic determination based on one or more of the one or more objects present at a given object identification device, a combination of individual objects present together at the given object identification device, or the geographic location of the given object identification device.

10. A system configured to update electronic information stored on objects, the individual objects being associated with virtual entities in a virtual space based on the individual objects embodying individual physical appearances of individual associated virtual entities, the first object being associated with the first virtual entity based on the first object embodying a physical appearance of the first virtual entity, the objects including a first object associated with a first virtual entity, the virtual space being accessible via one or more computing platforms, the one or more computing platforms being separate and distinct from the one or more objects, the system comprising:

one or more object identification devices, individual object identification devices being associated with individual real-world geographic locations, individual object identification devices being configured to detect one or more of the objects present at the geographic locations, the one or more object identification devices including a first identification device associated with a first geographic location; and one or more physical processors configured by machine-readable instructions to receive indications that the objects have been detected by the object identification devices; and update the information stored on the objects responsive the detection of the objects by the one or more object identification devices such that, responsive to reception of a first indication indicating that the first object has been detected by the first identification device associated with the first geographic location, information stored on the first object associated with the first virtual entity is updated.

11. The system of claim 10, wherein the one or more physical processors are further configured by machine-readable instructions to receive individual identifiers from individual objects that identify the individual objects responsive to the individual objects being detected such that, responsive to the first indication indicating that the first object has been detected by the first identification device, a first identifier is received from the first object.

12. The system of claim 11, wherein the one or more physical processors are further configured by machine-readable instructions to update the information stored on the objects based on the individual identifiers such that the information stored on the first object is updated based on the first identifier.

13. The system of claim 10, wherein the one or more physical processors are further configured by machine-readable instructions such that the information stored on the objects is updated to include information configured to facilitate unlocking virtual content associated with the virtual entities in the virtual space such that the information stored on the first object associated with the first virtual entity is updated to include information configured to facilitate unlocking virtual content associated with the first virtual entity in the virtual space.

14. The system of claim 13, wherein the one or more physical processors are further configured by machine-readable instructions such that the virtual content comprises one or more of skills, languages, powers, quests, pets, levels, rides, weapons, characters, mini-games, movie previews, virtual goods, or scenes.

15. The system of claim 10, wherein the individual object identification devices are configured to detect a plurality of individual objects together responsive to the objects being in the same geographic location at the same time, wherein the plurality of individual objects include the first object and a second object, the second object being associated with a second virtual entity, such that the first identification device associated with the first geographic location is configured to detect the first object and the second object together responsive to the first object and the second object being in the first geographic location at the same time.

16. The system of claim 15, wherein the one or more physical processors are further configured by machine-readable instructions to update the information stored on the objects responsive to the detection of the plurality of individual objects together at the geographic locations associated with the identification devices such that the information stored on the first object associated with the first virtual entity is updated based on the detection of the first object with the second object by the first identification device associated with the first geographic location.

17. The system of claim 16, wherein the one or more physical processors are further configured by machine-readable instructions such that the information stored on the objects is updated to include information configured to facilitate unlocking content associated with multiple virtual entities in the virtual space, the content associated with the multiple virtual entities in the virtual space comprising one or more of a group activity, a game, a scavenger hunt, a skill, a language, a power, a quest, a pet, a level, a ride, a weapon, a character, a mini-game, virtual goods, a scene, or a movie preview.

18. The system of claim 17, wherein the one or more physical processors are further configured by machine-readable instructions such that the information configured to facilitate unlocking content associated with multiple virtual entities in the virtual space is determined stochastically, the stochastic determination based on one or more of the objects present at a given object identification device, a combination of individual objects present together at the given object identification device, or the geographic location of the given object identification device.

19. A system configured to manage virtual content within a virtual space based on electronic information stored on objects, the individual objects being associated with individual virtual entities in the virtual space based on the individual objects embodying individual physical appearances of individual associated virtual entities, the objects including a first object associated with a first virtual entity, the first object being associated with the first virtual entity based on the first object embodying a physical appearance of the first virtual entity, the system comprising:

a console reader configured to detect objects in proximity to the reader, read the electronic information stored on the objects, and generate output signals conveying information related to the electronic information stored on the objects, the electronic information stored on the objects including information related to the objects being previously detected in geographic locations; and one or more physical processors configured by machine-readable instructions to:

store game play information for presentation in the virtual space, the virtual space being accessible via one or more computing platforms, the one or more computing platforms being separate and distinct from the one or more objects, the game play information including sets of geographic location content associated with the geographic locations such that a first set of geographic location content is associated with a first geographic location; and responsive to receiving the information related to the electronic information stored on the objects, update information defining the virtual entities in the virtual space based on the information stored on the objects, wherein updating the information comprises unlocking one or more of the sets of geographic location content that correspond to the geographic locations where the objects were previously detected, such that updating information defining the first virtual entity comprises unlocking the first set of geographic location content associated with the first geographic location responsive to receiving information defining the first object being previously detected in the first geographic location.

20. The system of claim 19, wherein the one or more physical processors are further configured by machine-readable instructions to receive individual identifiers from individual objects that identify the individual objects responsive to the individual objects being detected by the console reader such that, responsive to the first object being detected by the console reader, a first identifier being received from the first object.

21. The system of claim 20, wherein the one or more physical processors are further configured by machine-readable instructions to update the information defining the virtual entities in the virtual space based on the individual identifiers received from the individual objects such that the information defining the first virtual entity is updated based on the first identifier.

22. The system of claim 19, wherein the console reader is configured to detect a plurality of individual objects together responsive to the objects being in proximity to the reader at the same time, wherein the plurality of individual objects include the first object and a second object associated with a second virtual entity, and the console reader is configured such that the first object and the second object are detected together responsive to the first object and the second object being in proximity to the console reader at the same time.

23. The system of claim 22, wherein the one or more physical processors are further configured by machine-readable instructions such that the updated information defining the virtual entities in the virtual space is determined stochastically, the stochastic determination based on the information from the individual objects detected together at the console reader.

24. The system of claim 19, wherein the electronic information stored on the objects includes information defining individual objects being previously detected in geographic locations with other individual objects.

25. The system of claim 24, wherein the one or more physical processors are further configured by machine-readable instructions such that the updated information defining the virtual entities in the virtual space is determined stochastically, the stochastic determination based on the information defining the individual objects being previously detected in geographic locations with other individual objects.

* * * * *